(12) United States Patent
Lee

(10) Patent No.: US 6,721,735 B1
(45) Date of Patent: Apr. 13, 2004

(54) METHOD AND APPARATUS FOR SYNCHRONIZING DATABASES IN A NETWORK MANAGEMENT SYSTEM

(75) Inventor: Ted Chongpi Lee, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 316 days.

(21) Appl. No.: 09/697,281

(22) Filed: Oct. 26, 2000

Related U.S. Application Data

(60) Provisional application No. 60/188,898, filed on Mar. 13, 2000.

(51) Int. Cl.[7] ............................................. G06F 17/30
(52) U.S. Cl. ................................ 707/5; 707/10; 707/1; 707/3; 707/4; 707/8; 707/100; 707/201
(58) Field of Search ........................... 707/10, 201, 9, 707/8, 203, 5, 100, 1, 3, 4, 200, 202, 204; 709/217, 218, 200, 203, 205, 206, 221, 223, 225, 226, 227, 228, 231, 245; 711/161; 713/200; 370/469, 238, 337, 338, 352, 360, 428

(56) References Cited

U.S. PATENT DOCUMENTS

| | | | |
|---|---|---|---|
| 5,261,094 A | | 11/1993 | Everson et al. |
| 5,471,629 A | * | 11/1995 | Risch ........................ 707/201 |
| 5,649,195 A | | 7/1997 | Scott et al. |
| 5,897,632 A | | 4/1999 | Dar et al. ...................... 707/2 |
| 5,933,837 A | * | 8/1999 | Kung ........................ 707/201 |
| 5,953,347 A | * | 9/1999 | Wong et al. ................. 370/469 |
| 5,983,268 A | * | 11/1999 | Freivald et al. ............. 709/218 |
| 6,202,067 B1 | * | 3/2001 | Blood et al. .................. 707/10 |
| 6,256,634 B1 | * | 7/2001 | Moshaiov et al. .......... 707/100 |
| 6,347,374 B1 | * | 2/2002 | Drake et al. ................ 713/200 |
| 6,496,838 B1 | * | 12/2002 | Zamora-McKelvy et al. .... 707/201 |

OTHER PUBLICATIONS

H. Jagadish et al., "Scalable Versioning in Distributed Databases with Commuting Updates," *Proc. Data Eng.*, Apr. 1997, pp. 520–531.

T. Griffin et al., "A Framework for Using Redundant Data to Optimize Read–Intensive Database Applications," *Proc. Int'l Workshop on Real–Time Databases*, Sep. 1997.

P. Bohannon et al., "Logical and Physical Versioning in Main Memory Databases," *Proc. VLDB*, Aug. 1997.

\* cited by examiner

*Primary Examiner*—Shahid Alam
*Assistant Examiner*—Fred Ehichioya

(57) ABSTRACT

In an environment where databases are shared, it is important that the information contained within the databases be consistent among databases containing the respective information. Thus, there is a need for a method and apparatus for synchronizing databases containing related information comprising the steps of detecting a change to at least one database record in any of a first plurality of databases based on a first set of parameters; notifying a controller of the change; and updating, according to the detected change, each of a second plurality of databases containing the respective database record in response to a determination that the change falls within a second parameter.

21 Claims, 6 Drawing Sheets

| DCS IDENTIFIER 310 | LAST UPDATE₁ 320 | PORT IDENTIFIER 330 | LAST UPDATE₂ 340 | CIRCUIT IDENTIFIER 350 | LAST UPDATE₃ 360 |
|---|---|---|---|---|---|
| RA31 — 134 | 10/02/00 10:23:14 AM | 136₁ | 10/02/00 10:23:14 AM | CIRCUIT ONE | 10/02/00 10:23:14 AM |
| RA32 — 134 | 10/02/00 10:23:14 AM | 136₂ | 10/02/00 10:23:14 AM | CIRCUIT ONE | 10/02/00 10:23:14 AM |
| RA33 — 134 | 10/02/00 10:23:14 AM | 136₃ | 10/02/00 10:23:14 AM | | |

| DCS IDENTIFIER 310 | LAST UPDATE₁ 320 | PORT IDENTIFIER 330 | LAST UPDATE₂ 340 | CIRCUIT IDENTIFIER 350 | LAST UPDATE₃ 360 |
|---|---|---|---|---|---|
| RA31 — 134 | 10/02/00 10:23:14 AM | 136₁ | 10/02/00 10:23:14 AM | CIRCUIT ONE | 10/02/00 10:23:14 AM |
| RA32 — 134 | 10/02/00 10:23:14 AM | 136₂ | 10/02/00 10:23:14 AM | | 10/04/00 09:36:21 PM |
| RA33 — 134 | 10/02/00 10:23:14 AM | 136₃ | 10/04/00 09:29:54 PM | CIRCUIT ONE | 10/04/00 09:30:37 PM |

FIG. 4

| DCS IDENTIFIER 310 | LAST UPDATE$_1$ 320 | PORT IDENTIFIER 330 | LAST UPDATE$_2$ 340 | AVAILABILITY 410 | LAST UPDATE$_4$ 420 |
|---|---|---|---|---|---|
| 134 | DATE/TIME | 136$_1$ | DATE/TIME | NO | DATE/TIME |
| 134 | DATE/TIME | 136$_2$ | DATE/TIME | NO | DATE/TIME |
| 134 | DATE/TIME | 136$_3$ | DATE/TIME | YES | DATE/TIME |

METHOD AND APPARATUS FOR SYNCHRONIZING DATABASES IN A NETWORK MANAGEMENT SYSTEM

CROSS REFERENCE TO RELATED APPLICATIONS

This application claims benefit of U.S. Provisional Patent Application Ser. No. 60/188,898, which was filed on Mar. 13, 2000 and is incorporated herein by reference in its entirety.

TECHNICAL FIELD

The invention relates to the field of communications systems and, more specifically, to managing related data respectively stored in a plurality of databases in a network management system.

BACKGROUND OF THE INVENTION

It is often the case that related data may be stored in different databases. For example, a bank may store related data such as account information, credit history, customer data, etc., in different databases. It can be appreciated that over time related data associated with a particular account (i.e., a customer) may become inconsistent across the different databases. As such, when data associated with the account is selected by a particular banking application from one of the databases and processed, the end result may be incorrect because the selected data is not consistent with its associated data stored in the other databases.

As another example, in a telecommunications application, different data that is related in some way, e.g., facility, provisioning and maintenance data, may be stored in different databases. If a person enters a subscription for telephone services, the facilities to implement the subscription are selected from a provisioning database. However, the selected facilities may not actually be available. The reason for this may be, for example, that the facilities were marked unavailable due to maintenance activity and shown as such in a maintenance database, but were inadvertently left marked as available in the provisioning database. As such, a user would be unsuccessful in implementing the requested service as a result of trying to use facilities that were not available.

Currently, updates of database changes are done at set intervals such as at night globally, to specific tables and/or to parameters when the databases become inaccessible to users. Unfortunately, if a user were to access the respective database containing the database record before the update of the respective database, inconsistent data will be retrieved.

SUMMARY OF THE INVENTION

The invention comprises a method and apparatus for reducing inconsistencies between databases supporting the operation of a large telecommunications network.

Specifically, a method of synchronizing databases containing related information, comprising the steps of detecting a change to at least one database record in any of a first plurality of databases based on a first set of parameters; notifying a controller of the change; and updating, according to the detected change, each of a second plurality of databases containing the respective database record in response to a determination that the change falls within a second parameter.

BRIEF DESCRIPTION OF THE DRAWINGS

The teachings of the present invention can be readily understood by considering the following detailed description in conjunction with the accompanying drawings, in which:

FIGS. 3A and 3B together depict an exemplary element management table;

FIG. 4 depicts an exemplary inventory table; and

To facilitate understanding, identical reference numerals have been used, where possible, to designate identical elements that are common to the figures.

DETAILED DESCRIPTION OF THE INVENTION

The invention is discussed in the context of a telecommunications environment. However, the methodology of the invention can be readily adapted to suit the banking industry, a sales/warehouse environment and the like.

Figure 1A:
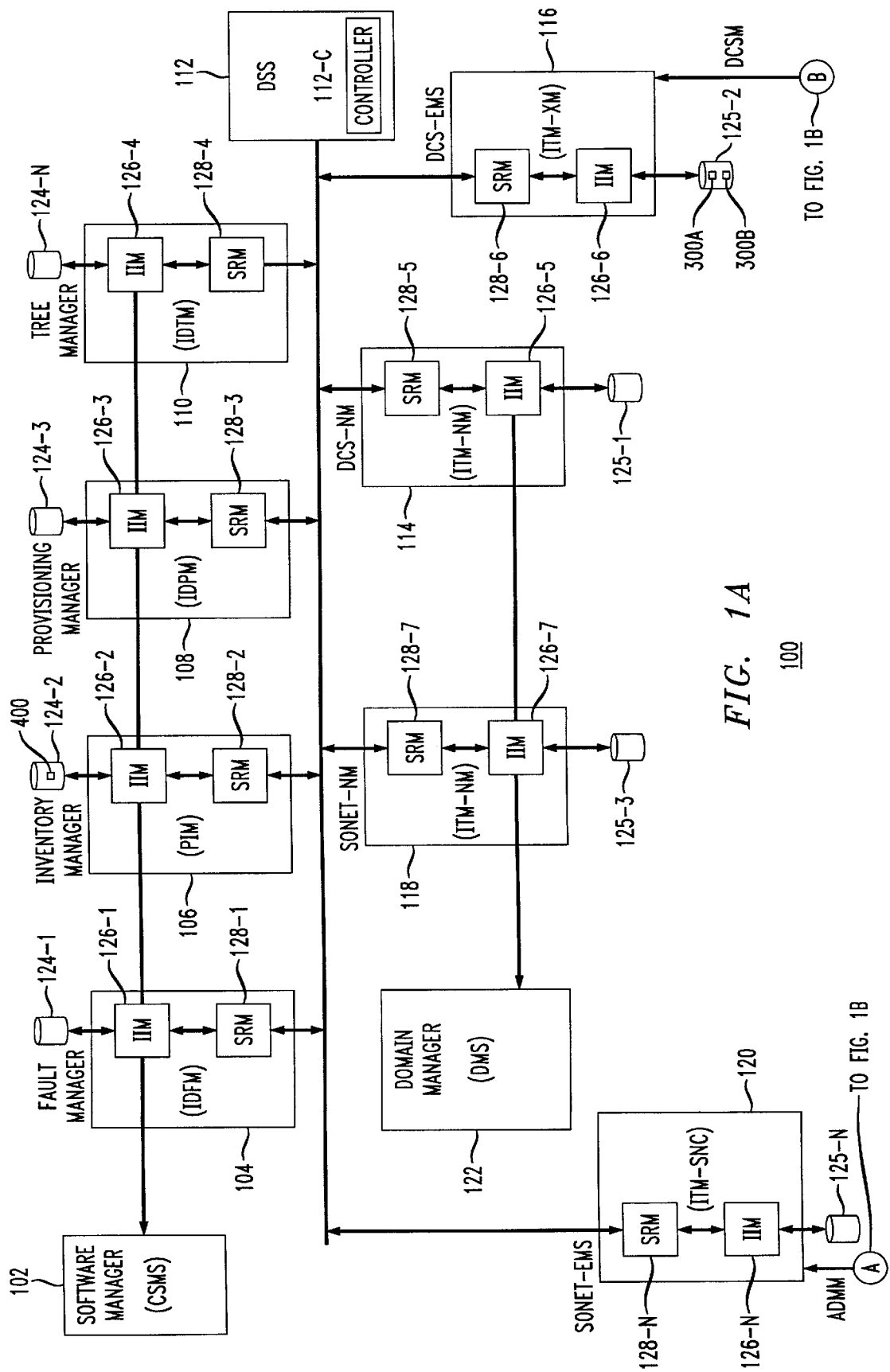
FIG. 1 depicts a high level block diagram of a communications system.
Figure 1B:
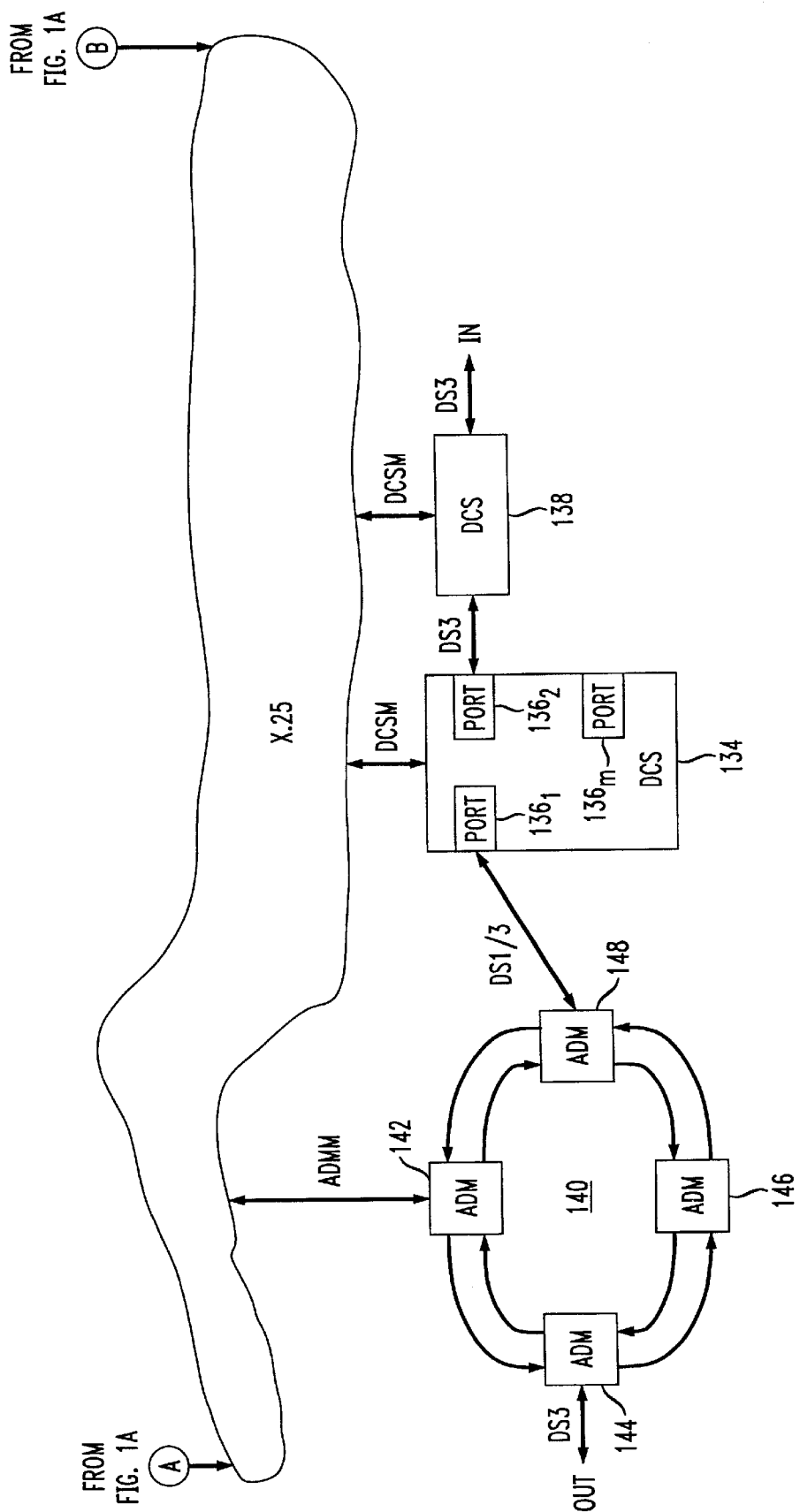

FIG. 1 depicts a high level block diagram of a communications system including the present invention. Specifically, the communications system 100 of FIG. 1 comprises a software manager 102, a fault manager 104, an inventory manager 106, a provisioning manager 108, a tree manager 110, a Database Synchronization Server (DSS) 112, a DSS controller 112-C, a Digital Cross Connect Network Manager (DCS-NM) 114, a DCS element management system 116, a Synchronous Optical Network Network Manager (SONET-NM) 118, a SONET element management system 120, a domain manager 122, a first plurality of independent databases 124-1 through 124-N (collectively database 124), a second plurality of independent databases 125-1 through 125-N (collectively database 125), a plurality of independent Intelligent Interface Modules (IIM) 126-1 through 126-N (collectively IIM 126), a plurality of independent notification send/receive modules (SRM) 128-1 through 128-N (collectively SRM 128), a communications link 130 and ), DCS 134, DCS 138, a SONET ring 140 and a circuit one.

The software manager 102, comprises, illustratively a Communications Software Management System (CSMS) manufactured by Lucent Technologies, Inc. of Murray Hill, N.J., which provides a distributed database for connectivity, inventory, capacity and fault management detection and covers multiple technologies, multiple domains and multiple services. The software manager 102 also implements software management related functions according to, for example, the Telecommunications Management Network (TMN) standards described in the International Telecommunications Union (ITU) recommendation M.3010 and related documents, which are incorporated herein by reference in their respective entities. Thus, the software manager 102 architecture includes the fault manager 104, the inventory manager 106, the provisioning manager 108, and the tree manager 110.

The fault manager 104, comprises, illustratively an Inter-Domain Fault Manager (IDFM) manufactured by Lucent Technologies, Inc. of Murray Hill, N.J., which detects errors within the telecommunications network for digital links and/or network elements and stores the information in database 124-1. Included within the fault manager 104 are SRM 128-1 which is coupled to communications link 130 and IIM 126-1 which is coupled to database 124-1, software manager 102 and IIM 126-2. Each SRM 128 is coupled to a respective IIM 126.

The inventory manager 106, comprises, illustratively a Physical Inventory Manager (PIM) manufactured by Lucent Technologies, Inc. of Murray Hill, N.J., which inventories telecommunications equipment in database 124-2. The inventory manager 106 includes IIM 126-2 which is coupled to IIM 126-3 and database 124-2 and SRM 128-2 which is coupled to communications link 130. Included in database 124-2 is table 400 which will be discussed further with respect to FIG. 4.

The provisioning manager 108, comprises, illustratively an Inter-Domain Provisioning Manager (IDPM) manufactured by Lucent Technologies, Inc. of Murray Hill, N.J., which designs telecommunication circuits based on a customer's design requirements and availability of facilities and network elements. Designed circuits are stored in database 124-3. IDPM 108 includes IIM 126-3 which is coupled to database 124-4 and IIM 126-3, and SRM which is coupled to communications link 130.

The tree manager 110, comprises, illustratively an Inter-Domain Tree Manager (IDTM) manufactured by Lucent Technologies, Inc. of Murray Hill, N.J., which links the domains of circuits. For example, an Interexchange Carrier's (IEC) circuit may go through areas owned and operated by Local Exchange Carriers (LECs). The portions of the circuit owned and operated by the IECs are considered domains. The portions of the circuit going through the LEC's area are considered a cloud. That is the IEC does not care what equipment or configuration the LEC uses to provide the IEC with their circuit as long as the "handoff" to the IEC is what the IEC ordered. The tree manager 108 provides a means of correlating the different portions or domains of the circuit to each other. Database 124-4 stores the relationship amongst domains. The tree manager 108 includes IIM 126-4 which is coupled to database 124-N and SRM 128-4 which is coupled to communications link 130.

Communications link 130 is coupled to DSS 112 which includes DSS controller 112-C. DSS 112 is used to capture the parameters of the changed databases and/or tables in the network managers or element management systems and communicate the changes to databases managed by software manager 102. Notification of database changes may be made via Common Object Request Broker Architecture (COBRA) technology. The database updates may be made using Open database Connectivity (ODBC), File Transfer Protocol (FTP) and/or Common Object Request Broker Architecture. It will be appreciated by those skilled in the art that other types of protocols may be used.

The domain manager 122, comprises, illustratively Domain Management System (DMS) manufactured by Lucent Technologies. Inc. of Murray Hill, N.J., which manages various domains including DCS-NM 114 and SONET-NM 118. However, it will be appreciated by those skilled in the art that domain manager 122 is not limited to the management of the above cited network managers.

The DCS-NM 114 and SONET-NM 118, comprise, illustratively Integrated Transport Management Network Managers (ITM-NMs) manufactured by Lucent Technologies, Inc. of Murray Hill, N.J. The network managers 114 and 118 implement network management related functions according to, for example, the Telecommunications Management Network (TMN) standards described in ITU recommendation M.3010 and related documents. Thus, network managers 114 and 118 are used to manage all network elements within a telecommunications network both individually and as a set of network elements. Network manager 114 and network manager 118 manage its respective elements.

The DCS-NM 114 manages DCS related network elements and includes SRM 128-5 which is coupled to communications link 130, and IIM 126-5 which is coupled to 126-6 and to database 125-1 which contains information relevant to digital cross connects managed by DCS-NM 114. Coupled to DCS-NM 114 is DCS element management system 116.

The DCS element management system 116 comprises, illustratively, an Integrated Transport Management Cross-Connect Module (ITM-XM) manufactured by Lucent Technologies, Inc. The DCS element management system 116 manages each DCS (e.g., 134 and 138) within the communication system 100 of FIG. 1. The DCS element management system 116 implements the element management layer of the TMN standard as it applies to DCS network elements. The DCS element management system 116 is coupled to each of the DCS network elements 134 and 138 to be managed via the Data Communications Network (DCN) 132, illustratively a public switched packet data network (PSPDN) utilizing the X.25 layered packet transmissions protocol. The communications path between the DCS element management system 116 and the managed DCS network elements is denoted as DCSM.

The DCS element management system 116 includes SRM 128-6 which is coupled to communications link 130, and IIM 126-6 which is coupled to database 125-2. The database 125-3 contains a plurality of tables, two of which are Tables 300A and 300B, which will be discussed further with respect to FIG. 3.

The SONET-NM 118 manages SONET related elements and includes SRM 128-7 which is coupled to communications link 130, and IIM 126-7 which is coupled to DMS 122 and to database 125-2 which includes a plurality of tables (not shown). Coupled to SONET-NM 118 is SONET element management system 120.

The SONET element management system 120 comprises, illustratively an Integrated Transport Management SONET Network Controller (ITM-SNC) manufactured by Lucent Technologies, Inc. The SONET element management system 120 manages all independent SONET network elements, such as Add-Drop Multiplexers (ADMs) within the network 100 of FIG. 1. The SONET element management system 120 implements the element management layer of the TMN standard as it applies to SONET network elements. The SONET element management system 120 is coupled to each of the SONET network elements to be managed via the DCN 132. The communications path between the SONET element management system 120 and the managed SONET network elements is denoted as ADMM. Specifically one ADM within each of the SONET ring 140 operates as a Gateway Network Element (GNE) that is coupled to the SONET element management system 120 via the DCN 132. Furthermore, the SONET embedded data communications channel (DCC) is used for the SONET ADM communications within a ring. In this manner, each of the network elements within the SONET ring is managed by the SONET element management system 120 in substantially a standard manner.

The SONET element management system 120 includes SRM 128-N which is coupled to communications link 130 and IIM 126-N which is coupled 125-N which includes a plurality of tables (not shown).

The Data Communications Network (DCN) 132 comprises, illustratively, a public switched packet data network (PSPDN) utilizing the X.25 layered packet transmissions protocol. However, it will be appreciated by those skilled in the art that the DCN 132 may be implemented using any network control channel or protocol suitable for providing such network management communication between network elements.

Each DCS 134 and 138 is capable of accessing the lower data rate channels within a high data rate multiplex signal and coupling the low data rate channels to different network elements via different DCS output ports. For example, the low data rate channels may comprise DS-1, DS-3 or STS-1 signals multiplexed within a high data rate channel comprising an OC-3 or OC-12 signal. In the exemplary embodiment of FIG. 1, each DCS communicates using DS-1, DS-3 or OC-3 signals.

In the exemplary embodiment of FIG. 1, the first DCS 134 includes a plurality of input/output ports denoted as $136_1$, $136_2$ and so on up to $136_m$ (collectively ports 136). The DCS system 134 is capable of connecting signals between the various ports 136.

The second DCS 138 is coupled to the first DCS 134 via, illustratively, a digital signal level 3 (DS-3) signal path. The second DCS 138 is also shown as receiving an input signal IN, illustratively a DS3.

The SONET ring 140 is depicted as,comprising four add-drop multiplexers (ADMs) 142, 144, 146, and 148. However, it will be appreciated by those skilled in the art that SONET rings of any number of ADMs may be employed within the context of the invention. Moreover, it is not necessary for the practice of the invention that SONET ring structures be used (though the invention is particularly attractive in such networks). Rather, the invention is applicable to any grouping of SONET network elements where logical or physical separation of such SONET network elements from DCS network elements may be employed to simplify network management.

The SONET ring 140 will be described as unidirectional path-switched rings (UPSR). However, it will be appreciated by those skilled in the art that other network structures may be implemented, such as bi-directional path-switched ring (BPSR), unidirectional line-switched ring (ULSR) and bi-directional line-switched ring (BLSR) topologies.

SONET ring 140 comprises four ADM network elements denoted as ADMs 142, 144, 146 and 148. The exemplary first SONET ring 140 comprises a unidirectional path-switched ring (UPSR), illustratively a Lucent Technologies DDM-2000 OC-3 Ring Network. The first ADM 142 serves as a gateway network element (GNE) and is coupled to the SONET element management system 116 via the management control path ADMM. The fourth ADM 148 is coupled to the first port $136_1$, of the DCS system 134. The second ADM 144 is shown as providing an OUT signal, illustratively a DS3 signal. The path of the input signal IN to output signal OUT, comprises a circuit. More specifically, the path describes circuit one.

The SONET ring 140 comprises a homogeneous SONET ring coupled to the first port $136_1$, of the DCS 134. SONET ring 140 is managed as a ring structure, rather than as a plurality of arcs, by the SONET EMS 120. The first port $136_1$, of the DCS 134 is managed by the DCS EMS 116.

The DCS 134 is characterized, for management purposes, as a DCS network element that is coupled to a SONET network element via a digital link. That is, the DCS switching equipment within the hybrid DCS 134 is characterized as a DCS network element while the SONET equipment (e.g., ADM 142) within the hybrid DCS 134 is characterized as a SONET ring structure. Communication between the ADM 142 and the appropriate DCS equipment within the DCS 134 is achieved via a digital link, illustratively a DS1/3 signal.

As a change is made to circuit one which is reflected in a change to a respective field in the databases of the network managers 114 and 118 and/or element managers 116 and 120, the change is communicated by SRM 128 to DSS 112 via communications link 130. If the change is outside the normal workflow, DSS 112 communicates the change to databases in software manager 102 which contain respective information.

In this manner, circuits designed after the update will contain accurate information as opposed to waiting to do a bulk update of a database table at a scheduled time wherein inaccurate information may be contained in circuits built during the interim of waiting for a bulk database update. However, the scheduled bulk updates are still completed to protect against occurrences such as failure to notify DSS 112 of a change in a database, communication failure and DSS 112 failure.

Figure 2:
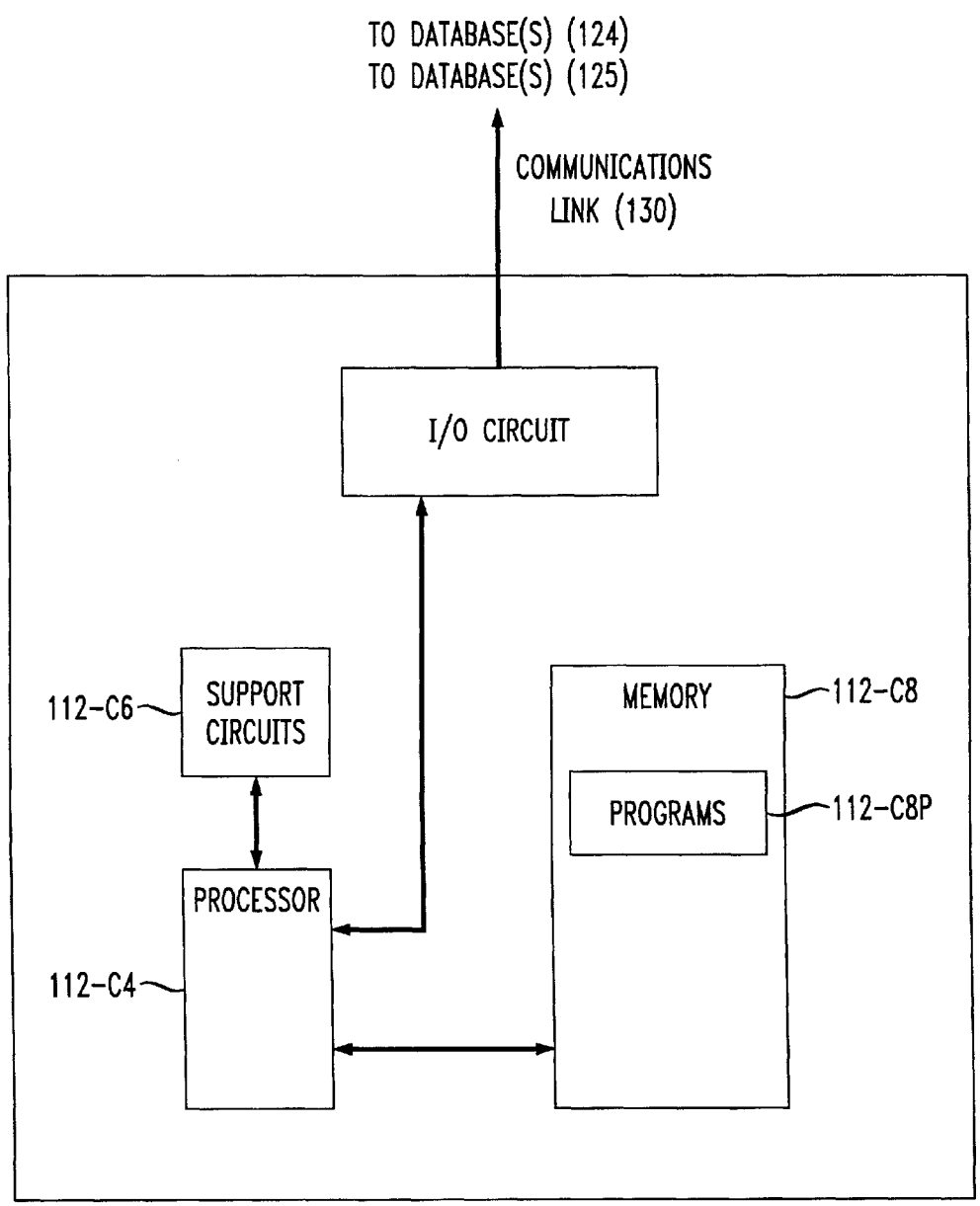
FIG. 2 depicts a high level block diagram of a controller suitable for use in the communications system of FIG. 1.

FIG. 2 depicts a high level block diagram of a controller suitable for use in the communications system 100 of FIG. 1. Specifically, the exemplary controller 112-C of FIG. 2 comprises a processor 112-C4 as well as memory 112-C8 for storing various element management and control programs 112-C8P. The processor 112-C4 cooperates with conventional support circuitry 112-C6 such as power supplies, clock circuits, cache memory and the like as well as circuits that assist in executing the software routines stored in the memory 112-C8. As such, it is contemplated that some of the process steps discussed herein as software processes may be implemented within hardware, for example, as circuitry that cooperates with the processor 112-C4 to perform various steps. The controller 112-C also contains input-output (I/O) circuitry 112-C2 that forms an interface between the various functional elements communicating with the DSS 112. For example, in the embodiment of FIG. 1, the DSS 112 communicates with the first plurality of databases 124 and the second plurality of databases 125 via a communications link 130.

Although the DSS 112 of FIG. 2 is depicted as a general purpose computer that is programmed to perform various database synchronization functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

FIGS. 3A and 3B together depict an exemplary element management table. Specifically, table 300A of FIG. 3A comprises a plurality of records RA31 through RA33, each record being associated with a respective DCS identifier field 310, a last update$_1$, field 320, a port identifier field 330, a last update$_2$ field 340, a circuit identifier field 350 and a last update$_3$ field 360.

DCS identifier field 310 indicates the identity of a particular DCS. The last update$_1$, field 320 is transparent and indicates the date and time records RA31 through RA33 were updated for DCS identifier field 310. The port identifier field 330 indicates a particular port number for a circuit. The last update$_2$ field 340 is transparent and indicates the date and time records RA31 through RA33 were updated for port identifier 330. The circuit identifier field 350 identifies a particular circuit. The last update$_3$ field 360 is transparent and indicates the date and time records RA31 through RA33 were updated for circuit identifier field 350.

Record RA31 of table 300A indicates that for DCS "134" which was updated on 10/02/00 at 10:23:14 AM, port number "$136_1$" which was updated on 10/02/00 at 10:23:14

AM, has "circuit number one" which was updated on 10/02/00 at 10:23:14 AM passing through the port.

Record RA32 of table 300A indicates that for DCS "134" which was updated on 10/02/00 at 10:23:14 AM, port number "$136_2$" which was updated on 10/02/00 at 10:23:14 AM, has "circuit number one" which was updated on 10/02/00 at 10:23:14 AM passing through the port.

Record RA33 of table 300A indicates that for DCS "134" which was updated on 10/02/00 at 10:23:14 AM, port number "$136_3$" which was updated on 10/02/00 at 10:23:14 AM, has no circuit passing through the port and no updates.

FIG. 3B which depicts table 300B is the same as table 300A except changes have been made to records RA32 and RA33. Specifically, record RA32 of table 300B indicates that for DCS "134" which was updated on 10/02/00 at 10:23:14 AM, port number "$136_2$" which was updated on 10/02/00 at 10:23:14 AM, has no circuit passing through the port. An update to the circuit field was made on 10/04/00 at 09:36:21 PM.

Record RA33 of table 300B indicates that for DCS "134" which was updated on 10/02/00 at 10:23:14 AM, port number "$136_3$" which was updated on 10/04/00 at 09:29:54 PM, has "circuit one" which was updated on 10/04/00 at 09:30:37 PM passing through the port.

The changes made to table 300A could have been the result of maintenance conducted on the circuit. That is, the customer could have complained of problems with the circuit which resulted in circuit one being moved to port $136_3$. The problem that arises is that changes to the databases of element management systems or network managers are not communicated to the databases of managers managed by software manager 102 until a bulk update is done. Thus, future circuits can be designed by provisioning manager 108 which utilize port $136_3$. The problem can best be understood by looking at FIG.4.

FIG. 4 depicts an exemplary inventory table 400. More specifically, table 400 depicts an inventory table contained in database 124-2 of inventory manager 106. In designing circuits, provisioning manager 108 uses information contained in the database 124-2 of inventory manager 106 to provide accurately designed circuits.

Table 400 of FIG. 4 comprises a plurality of records R41 through R43, each record being associated with a respective DCS identifier 310 field, a last update$_1$ field 320, a port identifier field 330, a last update$_2$ field 340, an availability field 410 and a last update$_4$ field 420. The availability field indicates whether a particular port of a particular DCS is available or not.

Record R41 of table 400 indicates that for DCS "134," port "$136_1$" the availability is "no". More specifically, it indicates that for DCS 134, port $136_1$ is either in use by a circuit or can not be used due to maintenance problems.

Record R42 of table 400 indicates that for DCS "134" port "$136_2$" the availability is "no". However, record R43 of table 400 indicates that for DCS "134" port "$136_3$" the availability is "yes". Each record has a field indicating when each record was last updated at a particular "date/time".

Table 400 indicates that a new circuit can be placed on DCS 134going through port $136_3$ which is in contradiction to table 300B. Thus, there is a discrepancy between an element management system database and an inventory management database.

Figure 5:
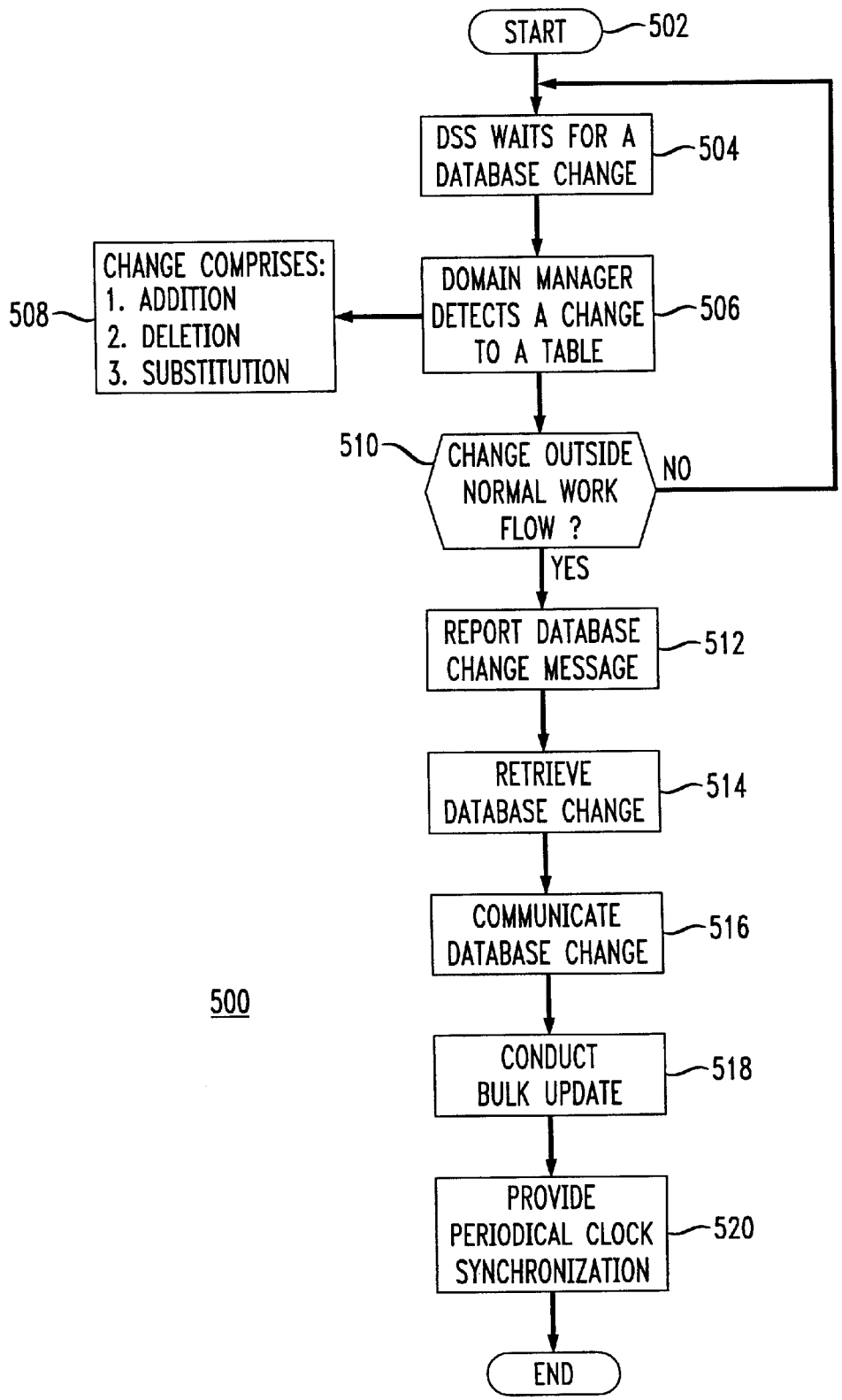
FIG. 5 depicts a flow diagram of a method according to the present invention.

FIG. 5 depicts a flow diagram of a method according to the invention. Specifically, FIG. 5 depicts a flow diagram of a method 500 for adapting a communications network in a manner tending to reduce synchronization problems.

The method 500 of FIG. 5 is entered at step 502 and proceeds to step 504 where DSS 112 waits for a database change from a network manager database or an element management database. The method 500 then proceeds to step 506.

At step 506, domain manager 122 detects a change to a table in the element manager database table(s) and/or network manager database table(s). This change is reflected in a change in the last update field. The method 500 then proceeds to step 508.

At step 508, the change can comprise any of an addition to a link, port, or network element, a deletion of a link, port or network element or a substitution of a link, port or network element. For instance, in circuit one of FIG. 1, first port $136_1$ may be changed to second port $136_2$ due to, for example, a defective first port $136_1$. That is, a substitution of ports would occur. Thus, if a new circuit were to be designed before a bulk update, the new circuit could be assigned to second port $136_2$ leading to administrative problems and a delay in providing service to the customer ordering the new circuit. The method 500 then proceeds to step 510

At step 510 a query is made as to whether the change is outside the normal workflow. Outside the normal workflow is defined as a change to the circuit design outside the initial design process. That is, after a circuit is designed either manually or by automation and a "word document" goes out to field personnel and the circuit is installed, changes are made to the circuit design after the software manager's 102 initial design process. If the query at step 510 is answered negatively, then the method 500 proceeds to step 504. If the query at step 510 is answered affirmatively, then the method 500 proceeds to step 512.

At step 512, a report database change message is communicated to DSS 112. That is, when a change is detected to database 124 by IIM 126, IIM 126 communicates this change to SRM 128 which, in turn, communicates the change to DSS 112 via communications link 130 which can utilize the CORBA notification system.

In response to receiving the report database change message, the DSS 112, at step 514, communicates a retrieve database change command to domain manager 122. The database 124 changes can be communicated to DSS 112 using protocols such as CORBA, ODBC, FTP and the like. The method 500 then proceeds to step 516.

At step 516, DS 112 communicates the database change to the database 124 of fault manager 104, inventory manager 106, provisioning manager 108 and the tree manager 110 all managed by software manager 102. Each manager managed by software manager 102 that contains respective information to database change will be updated. This prevents circuits from being designed with inaccurate information.

The database change update is from element management system to software manager 102 or from network manager to software manager 102. For database synchronization there is no DSS 112 update from network management system to element management system or from software manager 102 to network management system or element management system. The database updates from upstream to downstream, i.e., from software manager to NMS or EMS and from NMS to EMS are assumed to be embedded in the normal workflow without the need to invoke DSS 112. The method 500 then proceeds to step 518.

At step 518, the databases of managers managed by software manager 102 are updated in bulk. That is, all database tables of the network managers and or element management system are updated via FTP or ODBC to the database tables of managers managed by software manager 102. Bulk updates are normally scheduled at set times such as evenings and/or weekends. Bulk updates are necessary to synchronize whole databases due to DSS 112 failure and/or SRM 128 failure. The method 500 then proceeds to step 520.

At step 520, the DSS 112 provides a periodical clock synchronization capability so that the actual date/time in each operating system, manager and element manager can be synchronized manually or automatically. The method 500 then proceeds to step 522 where the method 500 ends.

Although various embodiments which incorporate the teachings of the present invention have been shown and described in detail herein, those skilled in the art can readily devise many other varied embodiments that still incorporate these teachings.

What is claimed is:

1. In a telecommunications management system comprising an inventory manager and a provisioning manager, said inventory manager including an inventory database comprising a plurality of data fields associated with respective network elements within a network to be managed, said provisioning manager including a provisioning database comprising a plurality of data fields associated with said respective network elements to be managed, with respect to communication links between said network elements used to provision circuits, a method of synchronizing the databases comprising:

detecting a change to at least one of said data fields associated with said respective network elements in any of the database based on a first set of parameters, wherein said first set of parameters comprises at least one of a deletion of an element, an addition of said element, and a substitution of said element;

notifying a controller of the change; and updating, according to the detected change, other database in said network containing the respective database record in response to a determination that said change falls within a second parameter, wherein the said second parameter further comprises a detection of a change outside a normal workflow in any of said first plurality of databases.

2. The method of claim 1, wherein said controller comprises a database synchronization server.

3. The method of claim 1, wherein said step of updating is done to each changed field.

4. The method of claim 1, wherein said step of notifying is done using Common Object Request Broker Architecture (CORBA) technology.

5. The method of claim 1, further comprising the step of updating the whole database.

6. The method of claim 5, wherein said step of updating the whole database is done by one of a manual request and a preset request.

7. The method of claim 1, wherein said telecommunications management system further comprises a fault manager including a fault manager database, said fault manager database comprising a plurality of data fields associated with said respective network elements.

8. The method of claim 1, wherein said step of updating the whole database is done by one of a File Transfer Protocol and using Open database Connectivity.

9. The method of claim 1, wherein said telecommunications management system further comprises a tree manager including a tree manager database, said tree manager database comprising a plurality of data fields associated with said respective network elements.

10. The method of claim 1, wherein each of said first plurality of databases includes at least one of:
    a date field for recording the date of the change; and
    a time field for recording the time of the change.

11. The method of claim 1, further comprising:
    providing periodical clock synchronization between said first set of plurality of databases and said second set of plurality of databases.

12. The method of claim 1, wherein said telecommunications management system further comprises:
    a digital cross connect system network manager (DCS-NM) including a DCS-NM database, said DCS-NM database comprising a plurality of data fields associated with said respective network elements; and
    a digital cross connect system element manager (DCS-EM) including a DCS-EM database, said DCS-EM database comprising a plurality of data fields associated with said respective network elements.

13. The method of claim 12, wherein said telecommunications management system further comprises:
    a SONET network manager (SONET-NM) including a SONET-NM database, said SONET-NM database comprising a plurality of data fields associated with said respective network elements; and
    a SONET element manager (SONET-EM) including a SON ET-EM database, said SONET-EM database comprising a plurality of data fields associated with said respective network elements.

14. A telecommunications management system comprising:
    an inventory manager including a manager database comprising a plurality of data fields associated with respective network elements within a network to be managed;
    a provisioning manager including a provisioning database comprising a plurality of data fields associated with said respective network elements to be managed;
    a communications link between said network elements used to provision circuits; and
    a controller for updating any of said databases based on a change to any respective data fields In response to a determination that said change falls within a first and second parameter, wherein said first parameter comprises at least one of a deletion of an element, an addition of said element, and a substitution of said element; and wherein said second parameter comprises a detection of a change outside a normal workflow in any of said first plurality of databases.

15. The apparatus of claim 14, wherein said controller comprises a database synchronization server.

16. The apparatus of claim 14, wherein said element comprises at least one of:
    a digital link; and
    a network element.

17. The apparatus of claim 14, wherein said updating is done using at least one of:
    File Transfer Protocol (FTP);
    Open Database Connectivity (ODBC); and
    Common Object Request Broker Architecture (CORBA).

18. The apparatus of claim 14, wherein said controller further provides periodical clock synchronization between said first plurality of databases and said second plurality of databases.

19. The apparatus of claim 14, further comprising:
    a digital cross connect system network manager (DCS-NM) including a DCS-NM database, said DCS-NM database comprising a plurality of data fields associated with said respective network elements; and a digital cross connect system element manager (DCS-EM) including a DCS-EM database, said DCS-EM database comprising a plurality of data fields associated with said respective network elements.

20. The apparatus of claim 19, further comprising:

a SONET network manager (SONET-NM) including a SONET-NM database, said SONET-NM database comprising a plurality of data fields associated with said respective network elements; and a SONET element manager (SONET-EM) including a SONET-EM database, said SONET-EM database comprising a plurality of data fields associated with said respective network elements.

21. In a telecommunications management system comprising an inventory manager and a provisioning manager, said inventory manager including a manager database comprising a plurality of data fields associated with respective network elements within a network to be managed, said provisioning manager including a provisioning database comprising a plurality of data fields associated with said respective network elements to be managed, with respect to communication links between said network elements used to provision circuits, a computer readable medium storing a software program that, when executed by a computer, causes the computer to perform a method of synchronizing the database comprising:

detecting a change to at least one of said data fields associated with said respective network elements in any of the databases based on a first set of parameters;

notifying a controller of the change, wherein said first parameter comprises at least one of a deletion of an element, an addition of said element, and a substitution of said element; and updating, according to the detected change, other databases in said network containing the respective database record in response to a determination that said change falls within a second parameter, wherein said second parameter comprises a detection of a change outside a normal work flow in any of said second set of database records.

* * * * *